Feb. 2, 1943.  J. J. PRENDERGAST ET AL  2,310,164
ELECTRODE HOLDER
Filed March 25, 1942    2 Sheets-Sheet 2

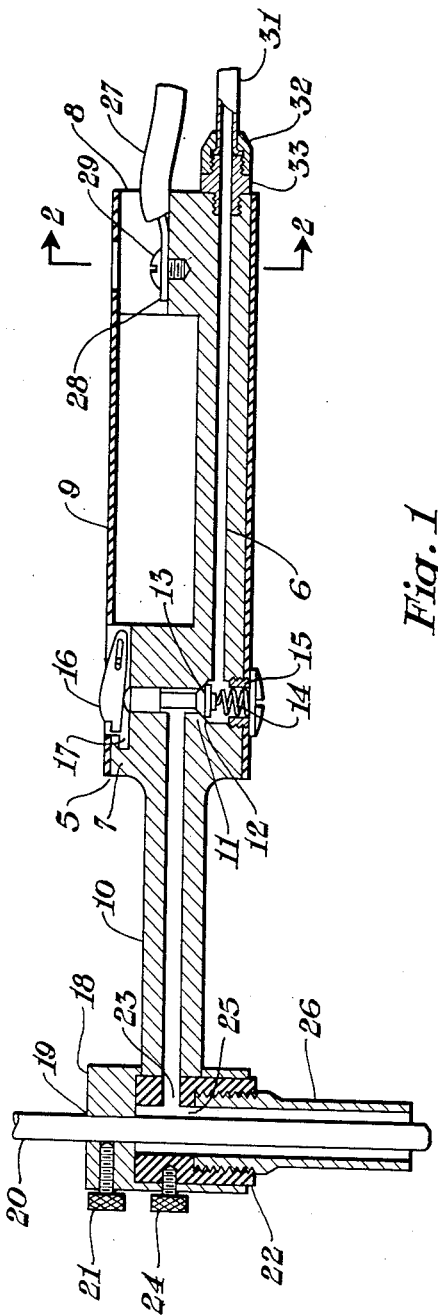
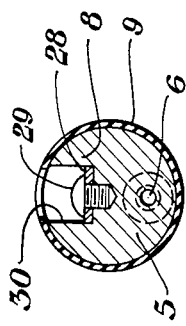

INVENTOR.
James J. Prendergast
Ronald A. Jones
Watrous N. Guillett
BY
Griswold & Burdick
ATTORNEYS Patented Feb. 2, 1943

2,310,164

UNITED STATES PATENT OFFICE 2,310,164

ELECTRODE HOLDER

James J. Prendergast, Bay City, Ronald A. Jones, Midland, and Watrous N. Guillett, Essexville, Mich., assignors to The Dow Chemical Company, Midland, Mich., a corporation of Michigan Application March 25, 1942, Serial No. 436,175

7 Claims. (Cl. 219—15)

This invention relates to an electrode holder for use in gas-shielded electric arc welding.

In the arc-welding of certain metals, particularly readily oxidizable metals such as magnesium and magnesium alloys, very advantageous results are secured by surrounding the arc zone during welding with a blanket of an inert gas, e. g. helium, which serves to exclude air from the molten metal and thus to prevent formation of oxide inclusions in the weld. A number of methods of effecting gas blanketing have been proposed, such as enclosing the work in a special gas chamber or directing a blast of gas at the work from suitably placed nozzles, but the apparatus employed has been so cumbersome that the methods have met with little acceptance by practical welders.

The principal object of the present invention, then, is to provide apparatus for use in gas-shielded arc-welding which avoids the disadvantages inherent in prior equipment and is simply constructed, portable, and easily manipulated. Another object is to provide a compact light-weight electrode holder which serves both to conduct electric current to the welding electrode and to direct and control the flow of protective gas toward the weld area.

The electrode holder of the present invention essentially comprises a gas conduit mounted in an insulating handle, means connecting the conduit to a source of gas, a gas-directing head mounted on one end of the conduit, means for securing a welding electrode within the head, and means for connecting such electrode to a source of current. In a preferred construction, the gas conduit is made electrically conducting, and serves both to carry electric current to the welding electrode and to convey a protective gas to the weld area. This dual use, together with other features to be explained, permits the holder to be much lighter in weight and more compact than gas-shielded arc-welding apparatus heretofore available.

The invention may be explained in detail with reference to the accompanying drawings, in which:

Fig. 1 is an elevation, partly in cross-section, of one form of electrode holder embodying the principle of the invention, showing a welding electrode in operating position;

Fig. 2 is a section of the same holder taken along the line 2—2 of Fig. 1;

Figures 3, 4:
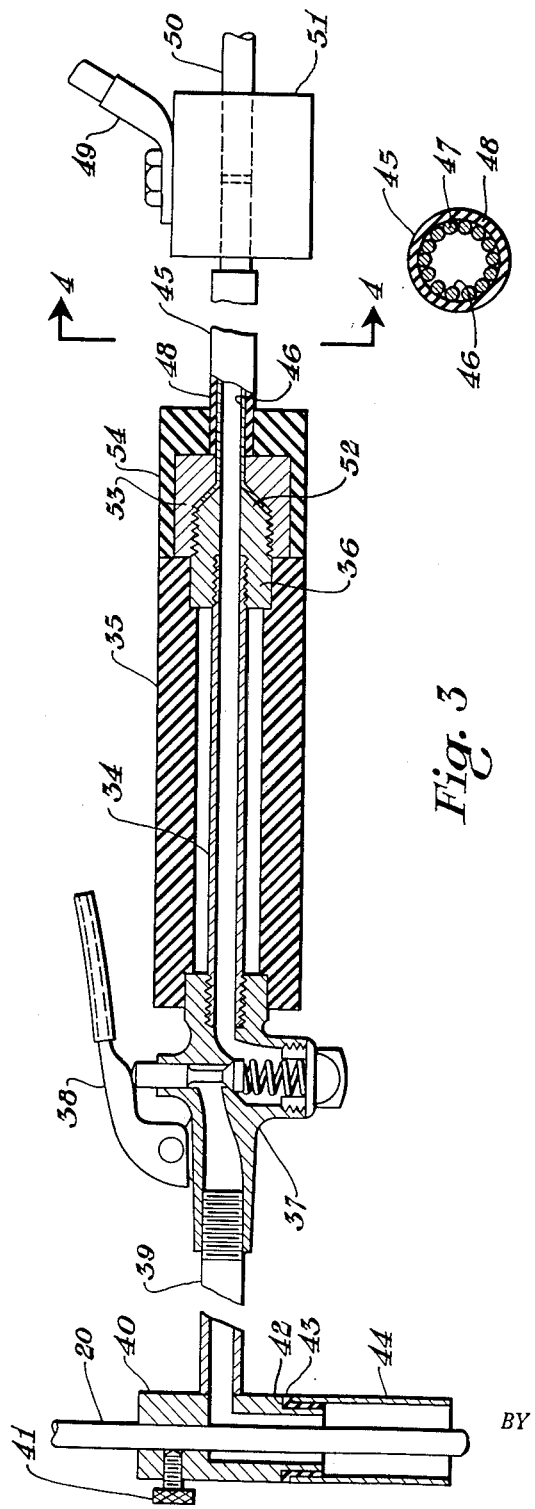
Fig. 3 is an elevation, partly in cross-section, illustrating another holder according to the invention, with a welding electrode in operative position.
Fig. 4 is a section of connecting cable used with the latter holder, taken along the line 4—4 of Fig. 3.

The holder shown in Figs. 1 and 2 consists essentially of a body 5 of electrically conducting material, such as steel or preferably a light-metal alloy, comprising a tubular gas conduit 6 provided with shoulders 7 and 8 which retain the body snugly within a hollow cylindrical handle 9 of electrical insulating material, such as polystyrene or a phenol-aldehyde resin. The conduit 6 projects beyond the end of the handle 9 in the form of a hollow extension 10 integral with the body, communication between the conduit and the extension being interrupted by a valve 11 formed within the shoulder 7. As shown, the valve includes a seat 12 against which a stemmed plug 13 is held normally closed by a spring 14 fitting within a hollow screw 15 threaded into the body 5. The plug 13 may be unseated by pressure applied on the stem thereof from an insulating button 16 pinned to the body and adapted to slide into a catch 17 so as to hold the valve open.

Mounted on the projecting end 10 of the gas conduit and integral therewith is an electrically conducting hollow cylindrical electrode head or nozzle 18, the interior of which is in communication with the conduit. This head is open at the lower end, but closed at the upper end except for a central restricted opening 19 to admit a welding electrode 20 axially through the head, the electrode being held firmly in position and in electrical contact with the head by a set screw 21. An insulating bushing 22, conveniently made of a phenol-aldehyde resin, and provided with a gas inlet port 23 registering with the outlet of the gas conduit 10, is held within the electrode head 18 by a screw 24 in position to enclose the welding electrode in spaced relation and to define an annular gas passage 25 therebetween. An electrode shielding tube or nozzle 26 having an inside diameter the same as that of the bushing 22 is screwed into the latter coaxially therewith and projects outwardly to form an extension of the annular passage 25 about the welding electrode.

Electric current is supplied to the holder from a cable 27 terminating in a lug 28 which is held in firm electrical contact with the gas conduit 6 by a screw 29 threaded into the base of a slot 30 cut in the conduit shoulder 8. Gas is supplied to the conduit 6 from a hose 31 which is clamped by a threaded bonnet 32 to a hollow adapter 33 screwed into the body 5 coaxially with the conduit 6.

In using the holder, a welding electrode, which in the welding of magnesium-base alloys may be a refractory material such as a tungsten rod, is inserted through the electrode head 18 so as to project slightly below the end of the shielding tube 26 and is clamped in position. The cable 27 and gas hose 31 are secured in place and the source of current and gas turned on. The assembly may then be used as in ordinary arc-welding, with the electric current flowing from its source through the body 6 to the head 18 and thence through the electrode to the work. At the same time, the welder presses on the button 16 to control the valve 11 and thus to allow protective gas to flow in regulated amount through the conduits 6 and 10, the head 18, and out of the shielding tube 26 so as to blanket the arc zone as welding proceeds.

In an alternative form of the invention, as illustrated in Fig. 3, gas and electric current are carried to the electrode head by a pipe 34 held within an insulating handle 35 by an adapter 36 which is threaded on one end of the pipe and fits into a recess on the inside of the handle. A conventional spring-opposed lever-operated valve 37 is screwed onto the pipe 34 at the end of the handle opposite the adapter, the valve being in such position that the valve lever 38 is brought within easy operation distance of the handle 35, the lever itself being covered with insulation. Secured into the other end of the valve 37, either rigidly by threading as shown, or by a swivel joint to permit lateral adjustment, is a second pipe 39 on the end of which is welded a hollow cylindrical electrode head 40, the interior of which is in communication with the pipe. This head 40 is open at one end and closed at the other except for a restricted opening through which a welding electrode 20 may be inserted and held in position by a set screw 41. As shown, the head 40 is formed with a shoulder 42 at its open end, over which an insulating bushing 43 is slipped. An electrode shielding tube 44 fits over the bushing 43 and projects from the head coaxial therewith in position to surround the welding electrode 20 extending axially out of the head and to define an annular gas passage about the same.

Gas and electric current are supplied to the holder of Fig. 3 through a combined gas and electric cable 45, which consists of an inner electrically conducting tube 46 formed of strands of conductors 47 and surrounded by a gas-tight electrically insulating hose 48 bonded to the tube 46, current and gas being conveyed to the cable from a lead 49 and a gas line 50 by means of an adapter block 51, as shown. At the electrode holder, insulation is removed from the cable for a short distance, and the inner metallic tube 46 is splayed over the conical tip 52 of the pipe adapter 36, being held in place by a corresponding threaded cap 53 which fits into a hollow cylindrical insulating block 54 having the same diameter as the handle 35.

The operation and manner of use of the holder of Fig. 3 are closely similar to those of the holder of Fig. 1.

From the foregoing it will be appreciated that the invention provides a simple, inexpensive, and easily manipulated holder for conveying both electric current and protective gas to the arc zone during gas shielded electric arc welding.

The preceding description will be understood to be illustrative rather than strictly limitative, the invention being coextensive in scope with the following claims.

We claim:

1. An electrode holder for use in gas-shielded electric arc-welding comprising, in combination: a hollow insulating handle; an electrically conducting gas conduit mounted within the handle and projecting beyond the end thereof; means for connecting the conduit to sources of gas and of electric current; a gas-directing hollow head mounted on the projecting end of the gas conduit, the interior of the head being in communication with the conduit; means for retaining a welding electrode in the head in electrical communication with the gas conduit; and an electrode shielding tube out of electrical communication with the gas conduit projecting outwardly from the gas-directing head in position to surround a welding electrode secured in the head and to define therewith an annular gas passage in communication with the interior of the head.

2. An electrode holder for use in gas-shielded electric arc welding comprising, in combination: a hollow insulating handle; an electrically conducting gas conduit mounted within the handle and projecting beyond the end thereof; means for connecting the conduit to sources of gas and of electric current; an electrically conducting cuplike electrode head mounted on the projecting end of the gas conduit in electrical contact therewith, the hollow interior of the head being in communication with the gas conduit; means for retaining a welding electrode in the head in electrical contact therewith; and an electrode shielding tube mounted on the electrode head out of electrical contact therewith and projecting outwardly in position to surround a welding electrode secured in the head and to define therewith an annular gas passage in communication with the interior of the head.

3. An electrode holder for use in gas-shielded electric arc welding comprising, in combination: a hollow insulating handle; an electrically conducting gas conduit mounted within the handle and projecting beyond the end thereof; a valve in the gas conduit; means for connecting the conduit to sources of gas and of electric current; an electrically conducting hollow electrode head mounted on the projecting end of the gas conduit in electrical contact therewith, the interior of the head being in communication with the gas conduit, and the head being open at one end and having a restricted opening at the other end to admit a welding electrode through the head; means for retaining a welding electrode in the head in electrical contact therewith; and an electrode shielding tube mounted on the electrode head out of electrical contact therewith but in gas communication with the interior thereof and projecting from the head in position to surround a welding electrode extending out of the head and to define an annular gas passage about the same.

4. An electrode holder for use in gas-shielded electric arc-welding comprising, in combination: a hollow insulating handle; an electrically conducting gas conduit mounted within the handle and projecting beyond the end thereof; a normally closed spring-opposed valve in the gas conduit; electrically insulated means, operatively associated with the handle, for opening the valve; means within the handle for connecting the gas conduit to sources of gas and of electric current; a gas-directing hollow head mounted on the projecting end of the gas conduit, the interior of the head being in communication with the conduit; means for retaining a welding electrode axially in the head in electrical communication with the gas conduit; and an electrode shielding tube mounted on the head out of electrical communication with the gas conduit projecting outwardly from the head in position to surround a welding electrode extending axially out of the head and to define an annular gas passage about the same.

5. An electrode holder for use in gas-shielded electric arc welding comprising, in combination: a hollow insulating handle; an electrically conducting gas conduit mounted in the handle and projecting beyond an end thereof; a normally closed spring-opposed valve in the gas conduit; electrically insulated means, operatively associated with the handle, for opening the valve; means within the handle for connecting the gas conduit to sources of gas and of electric current; an electrically conducting hollow cylindrical electrode head mounted on the projecting end of the gas conduit in electrical contact therewith, the interior of the head being in communication with the gas conduit, and the head being open at one end and having a restricted opening at the other end to admit a welding electrode through the head; clamping means for retaining a welding electrode axially in the head and in electrical contact therewith; and an electrode shielding tube mounted coaxially on the electrode head out of electrical contact therewith but in gas communication with the interior thereof and projecting from the head in position to surround a welding electrode extending axially out of the head and to define an annular gas passage about the same.

6. An electrode holder for use in gas-shielded electric arc welding comprising, in combination: a hollow insulating handle; an electrically conducting gas conduit mounted in the handle and projecting beyond an end thereof; a normally closed spring-opposed valve in the gas conduit; electrically insulated means, operatively associated with the handle, for opening the valve; means within the handle for connecting the gas conduit to sources of gas and of electric current; an electrically conducting hollow cylindrical electrode head mounted on the projecting end of the gas conduit in electrical contact therewith, the interior of the head being in communication with the gas conduit, and the head being open at one end and having a restricted opening at the other end to admit a welding electrode through the head; clamping means for retaining a welding electrode axially in the head and in electrical contact therewith; an electrically insulating bushing fitting within the electrode head, the interior of the bushing being in communication with the gas conduit and adapted to enclose in spaced relation a welding electrode retained in the head to define an annular gas passage therebetween; and an electrode shielding tube fitting into said bushing coaxially therewith and projecting outwardly therefrom in a position adapted to form an extension of the aforesaid annular gas passage about a welding electrode.

7. An electrode holder for use in gas-shielded electric arc welding comprising, in combination: a hollow insulating handle; an electrically conducting gas conduit mounted in the handle and projecting beyond an end thereof; a normally closed spring-opposed valve in the gas conduit; electrically insulated means, operatively associated with the handle, for opening the valve; means within the handle for connecting the gas conduit to sources of gas and of electric current; an electrically conducting hollow cylindrical electrode head mounted on the projecting end of the gas conduit in electrical contact therewith, the interior of the head being in communication with the gas conduit, and the head being open at one end and having a restricted opening at the other end to admit a welding electrode through the head; clamping means for retaining a welding electrode axially in the head and in electrical contact therewith; an insulating bushing fitting around the open end of the head; and an electrode shielding tube coaxial with the head fitting over said bushing and in gas communication with the interior of the head, and projecting therefrom in position to surround a welding electrode extending axially out of the head and to define an annular gas passage about the same.

JAMES J. PRENDERGAST.
RONALD A. JONES.
WATROUS N. GUILLETT.